US009834239B2

(12) United States Patent
Newton

(10) Patent No.: US 9,834,239 B2

(45) Date of Patent: Dec. 5, 2017

(54) CONVERTIBLE CARRIER

(71) Applicant: Julianne Schlimm Newton, Saint Marys, PA (US)

(72) Inventor: Julianne Schlimm Newton, Saint Marys, PA (US)

( * ) Notice: Subject to any disclaimer, the term of this patent is extended or adjusted under 35 U.S.C. 154(b) by 0 days.

(21) Appl. No.: 15/220,526

(22) Filed: Jul. 27, 2016

(65) Prior Publication Data

US 2017/0166228 A1 Jun. 15, 2017

Related U.S. Application Data

(60) Provisional application No. 62/177,666, filed on Jul. 6, 2015.

(51) Int. Cl.

*B62B 1/04* (2006.01)
*B62B 7/02* (2006.01)
*B62B 5/08* (2006.01)

(52) U.S. Cl.

CPC .............. *B62B 1/042* (2013.01); *B62B 5/082* (2013.01); *B62B 7/02* (2013.01)

(58) Field of Classification Search

CPC .. B62B 1/042; B62B 1/26; B62B 5/08; B62B 5/082; B62B 5/085; B62B 7/00; B62B 7/02; B62B 7/06; B62L 35/08; B62L 35/082; B62L 35/085; B62L 37/00; B62L 37/02; B62L 37/06; B62L 31/042

USPC .......................... 280/642, 647, 650, 657, 658

See application file for complete search history.

(56) References Cited

U.S. PATENT DOCUMENTS 3,726,536 A 4/1973 Arino
3,829,113 A * 8/1974 Epelbaum ............ B60N 2/2839 280/30
5,499,831 A * 3/1996 Worth ....................... B62B 7/08 280/30
6,155,592 A 12/2000 Hsia
6,209,892 B1 4/2001 Schaaf et al.
8,684,396 B1 * 4/2014 Hanson .................... A61G 5/08 280/47.4
8,967,657 B2 * 3/2015 Burchi ...................... B62B 7/06 280/649
9,050,989 B2 * 6/2015 Fleming .................... B62B 7/08

OTHER PUBLICATIONS

Model 420. (n.d.). Retrieved Mar. 27, 2017, from http://www.norriscorp.com/420.html.

* cited by examiner

*Primary Examiner* — John D Walters

(74) *Attorney, Agent, or Firm* — Dunlap Bennett & Ludwig PLLC; Brendan E. Squire

(57) ABSTRACT

An Infant car seat stroller that is fully collapsible and can convert to a general use cart. The stroller is universal to accept most car seats and is able to convert to a cart for multiple uses.

20 Claims, 6 Drawing Sheets

12 18 36 38 13 34 24 14 19 19 22 30 16 28 20 26 32 16 27 20

12
36
38
18
13
34
24
14
19
19
22
30
28
16
20
32
26
16
27
20

CONVERTIBLE CARRIER

CROSS-REFERENCE TO RELATED APPLICATION

This application claims the benefit of priority of U.S. provisional application No. 62/177,666, filed Jul. 6, 2015, the contents of which are herein incorporated by reference.

BACKGROUND OF THE INVENTION

The present invention relates carriers, and more particularly to collapsible carriers configured to transport a child car seat.

Currently, families with infants and small children have a need to transport their child, which is usually accomplished with a stroller and a car seat while they are traveling in a motor vehicle. While there are many strollers available, and even those that are configured to accept a car seat, their use is limited to use as a stroller. Similarly, for those that accept a car seat, they are proprietary in that they will only accept a car seat from the stroller manufacturer, while others will only accept a specific car seat model made specifically for the stroller.

Similarly, while many strollers and carriages are technically collapsible, even in their collapsed state, they require the extensive trunk space that is usually only found in a full sized car or a sport utility vehicle (SUV).

As can be seen, there is a need for a collapsible stroller that can provide a universal receiver for a child car seat. The stroller should also be collapsible to a compact state that requires only limited storage area and may be readily reconfigured for use as a utility cart.

SUMMARY OF THE INVENTION

In one aspect of the present invention, a collapsible cart, may include: an upright frame having a handle pivotally attached to an upper portion of the upright frame and an axel supporting a pair of ground transport wheels extending through a bottom portion of the upright frame; a base frame having a forward support at a front end of the base frame and an aft end that is pivotally disposed about the axel; and a receiver frame articulately connected to a forward portion of the base frame via a strut and releasably connected at an aft portion of the receiver frame to a cross member positioned at the upper portion of the upright frame. In some embodiments the cart may also include a latch pivotally disposed between opposed sides of the handle, wherein the latch selectably movable to an engaged position to secure the handle in an upright position. The latch may also be movable to a released position to permit the handle to pivot about the upright frame.

In other embodiments, a coupler plate is attached to an aft end of the receiver frame, and the coupler plate is releasably attached to the cross member via a fastener, which may include a quick release pin. In certain embodiments, an aft frame member extends rearwardly from an upper portion of the upright frame then downwardly and generally parallel to the upright frame a lower angled portion that extends forwardly to rejoin the upright frame at a bottom end thereof. In these embodiments the axel may be received through an aperture extending through the lower angled portion of the aft frame.

In other aspects of the invention, the receiver frame is configured to removably receive a child carrier. In some instances the child carrier is a car seat.

In yet other aspects of the invention, a collapsible cart, is configured with an upright frame having an axel extending through a bottom portion of the upright frame. The axel supports a pair of ground transport wheels. A base frame having an aft end that is pivotally disposed about the upright frame; and a receiver frame articulately connected to a forward portion of the base frame via a strut and releasably connected at an aft portion of the receiver frame to a cross member at the upper portion of the upright frame. The cart is configurable as a stroller and the receiver frame is configured to receive an infant car seat. The cart is also configurable as a utility cart.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a convertible carrier may be configured for the carriage and transport of a child car seat and reconfigurable for the carriage and transport of shopping items. The convertible carrier is fully collapsible and fits in the back seat of a car (no SUV needed to haul this stroller) and is indispensable for daily quick trips.

The convertible carrier allows the parent or caregiver to move a child that is safely strapped in their car seat, directly from the car to securing them safely and quickly in the stroller and go. After the child turns a year or 20 lbs and outgrows the stroller you can remove the stroller attachment and use the cart for every day hauling of groceries or a myriad of other items. The configuration of the carrier makes for a universal fit for most car seats and is easily reconfigurable to a multipurpose cart.

Figure 1:
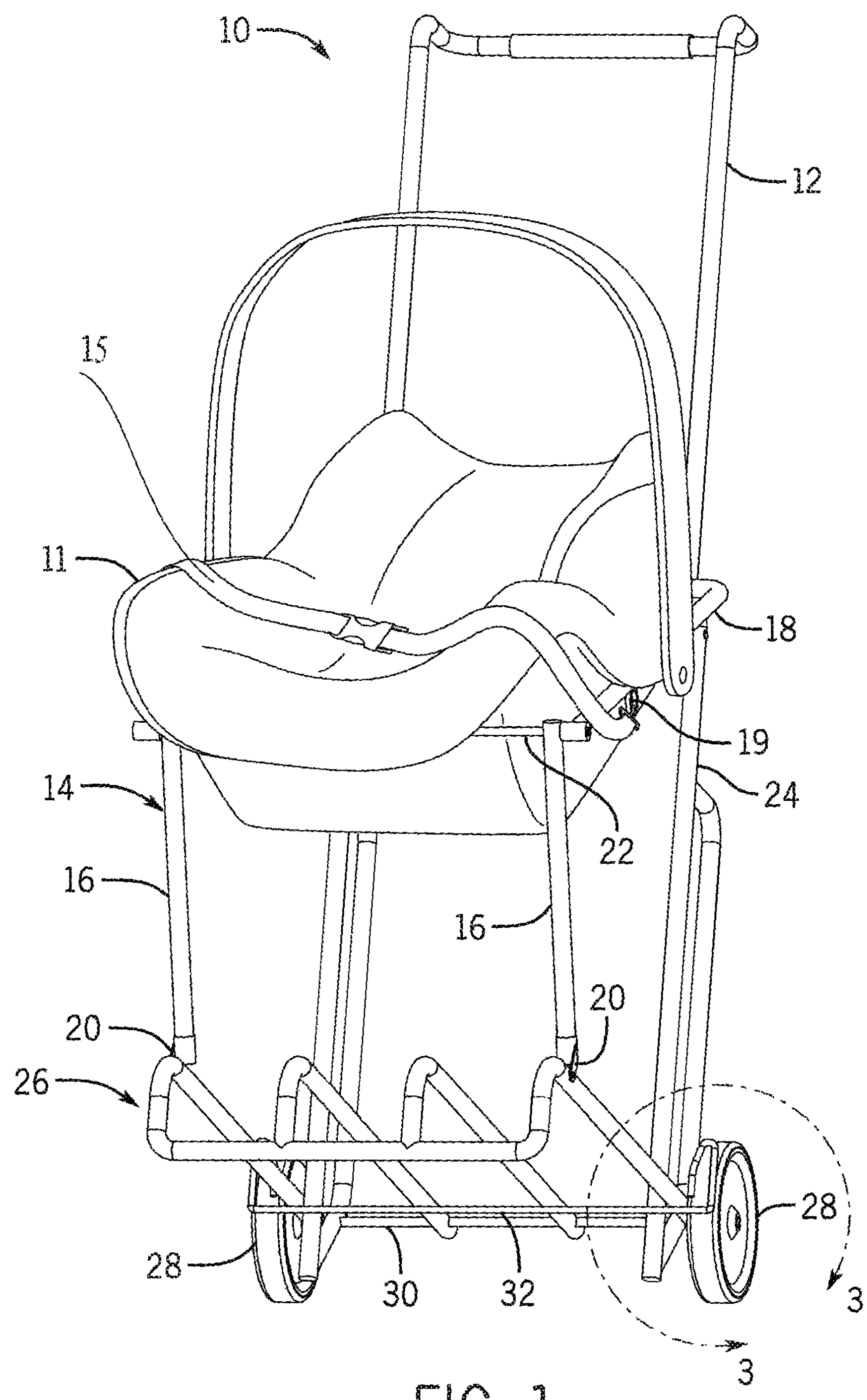
FIG. 1 is a front perspective view of the carrier in use with a child car seat.
Figure 2:
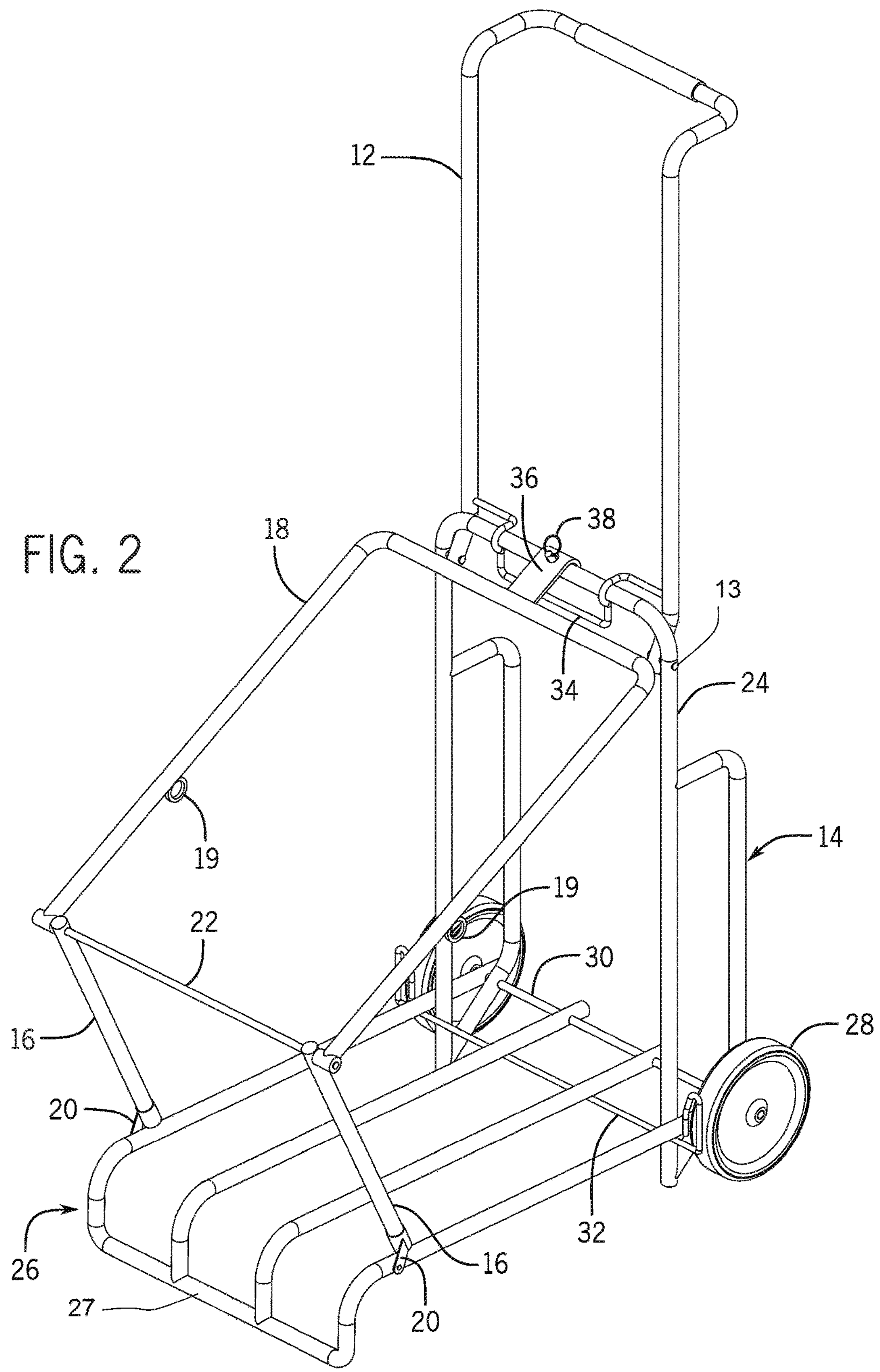
FIG. 2 is a perspective view of the carrier in a utility cart configuration.

As seen in reference to FIGS. 1 and 2, the convertible carrier 10 of the present invention comprises a frame assembly that in one configuration serves as a stroller, with the carrier receiving a child or infant car seat 11. In other configurations, the carrier serves as a utility cart, for the carriage of shopping, or sundry items.

The frame assembly includes an upright frame member 24, a handle 12 that is pivotally attached to the upright frame member at a top portion thereof, and a base frame member pivotally attached to the upright frame member 24 at a bottom portion thereof. A receiver frame 18 is articulately connected to a forward portion of the base member via a strut 16. A pair of ground wheels 28 are rotationally mounted to the upright frame member 24 for rolling of the carrier along a ground surface.

The upright frame member 24 is formed in an inverted generally U-shaped configuration having a top end and a bottom end. An aft frame member 14 extends rearwardly from an upper portion of the legs 24 then downwardly and generally parallel to the upright frame member legs 24 and then angles forwardly to rejoin the upright frame member 24 at the bottom end. A lower end portion of the aft frame members 14 have an aperture defined therein to receive an axel 30, which supports the pair of ground wheels 24.

A pin 13 located proximal to a cross member of the upright frame member 24 pivotally attaches a bottom end of the handle 12 such that the handle may be rotated about the pin 13 between an extended position and a stowed position. A latch 34 is pivotally disposed between the opposed sides of the handle 12 at a lower end thereof. The latch 34 may be pivotally moved between a latched position, in which it draws the opposed sides of the handle 24 in abutment with the upright member 24. The latch may be resiliently snapped around the cross member to retain the handle 12 in the extended position. The bottom ends of the handle 12 may have a forward curvature to provide a clearance for the handle 12 to fully rotate to an upright extended position, in which the handle is substantially parallel to the upright frame member 24. The latch 34 may be disengaged from the cross member to permit folding of the handle about the pivot 13 to place the handle 12 into a stowed position. Preferably, the handle 12 will have a narrower lateral width than the upright frame 24, such that it may be nested between the aft frame members 14 for stowage.

The base frame 26 may be formed from a plurality of elongate tubular members arranged in a spaced apart, substantially parallel configuration. The tubular members of the base frame 26 have an arcuate downwardly turned forward end that are interconnected by a forward support that is positioned such that the base frame is substantially parallel to the ground when the convertible carrier 10 is in a stationary, resting position. An aft end of at least the outer elongate tubular members have an aperture that receive the axel 30 and permit the base frame 26 to pivot about the axel 30 between an extended position and a stowed position.

Figure 3:
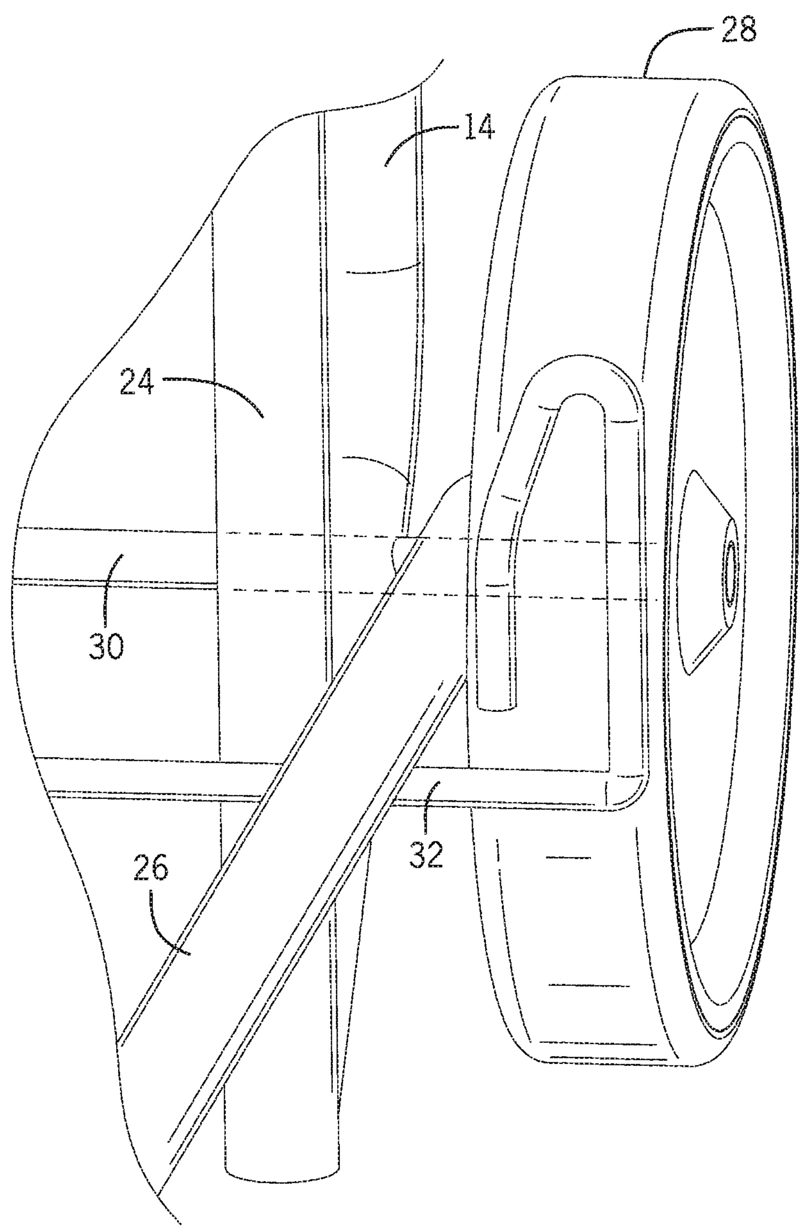
FIG. 3 is a detail perspective view indicated by line 3-3 of FIG. 1.

As seen in reference to FIG. 3, the base frame 26 may also include a base retainer 32 having a curled portion for resilient abutment against the outer elongate tubular members to retain the base member 26 in the extended position. With a sufficient pressure applied to the base frame 26, the outer elongate tubular members will overcome the resilient abutment of the retainer 32 to permit the base frame 26 to be pivotally rotated about the axel 30 to a stowed position.

A pivot arm 20 is attached at a forward end of the base frame 26 and interconnects a bottom end of the struts 16 with the base frame 16. A top end of the struts 16 have an aperture that receives a pivot rod 22 that pivotally interconnects the strut 16 with a forward end of the receiver frame 18. In some embodiments, the pivot arm 20 may be removably attached to the base frame 26, in order to facilitate conversion of the cart 10 to a utility cart. Alternatively, the struts 16 may be removably attached to the pivot arm 20.

The receiver frame 18 may be formed as a generally U shaped member, with the forward ends of the legs pivotally attached to the struts 16, as just described. An aft end of the receiver frame 18 has a coupling plate 36 attached to a cross section of the U-shaped receiver frame 18. The coupling plate 36 is shaped to generally conform to the cross member of the upright frame 24 and a fastener 38, such as a quick release pin, may be used to secure the receiver frame 18 to the upright frame. The fastener 38 may be readily released in order to reconfigure the receiver frame to a stowed condition. A retaining ring 19 may be provided along intermediate portions of the receiver legs for attachment of various child items or for coupling the child carrier 11 to the carrier 10, such as via a strap 15 that secures across a front portion of the carrier 11 with a buckle joining free ends of the strap 15.

Figure 6:
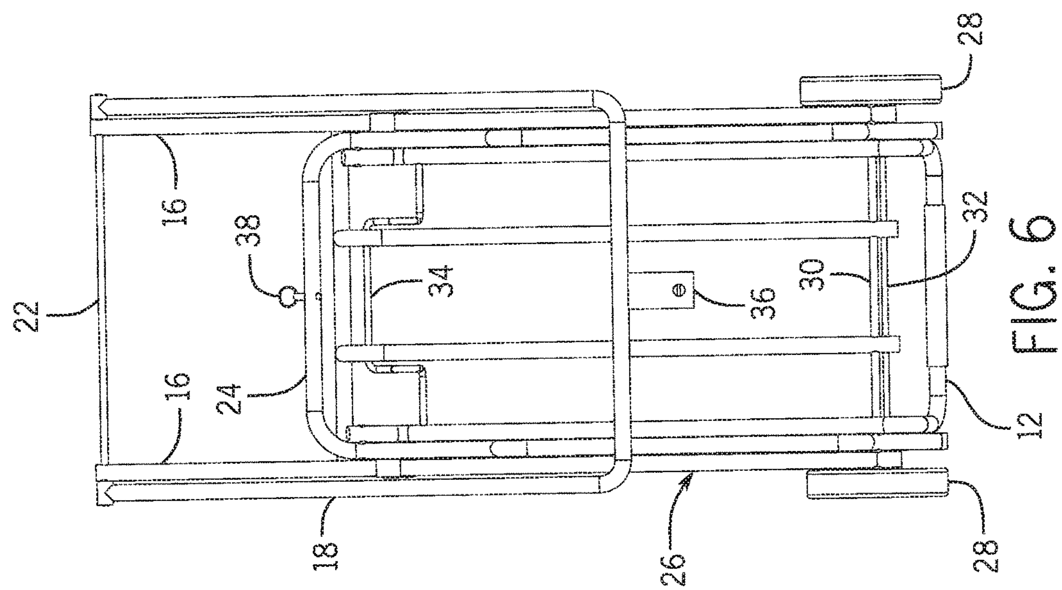
FIG. 6 is a rear elevation view of the carrier in a collapsed mode.
Figure 5:
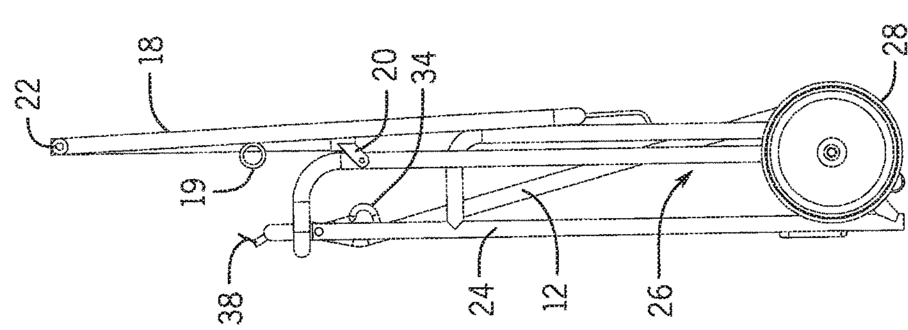
FIG. 5 is a side elevation view of the carrier in a collapsed mode.
Figure 4:
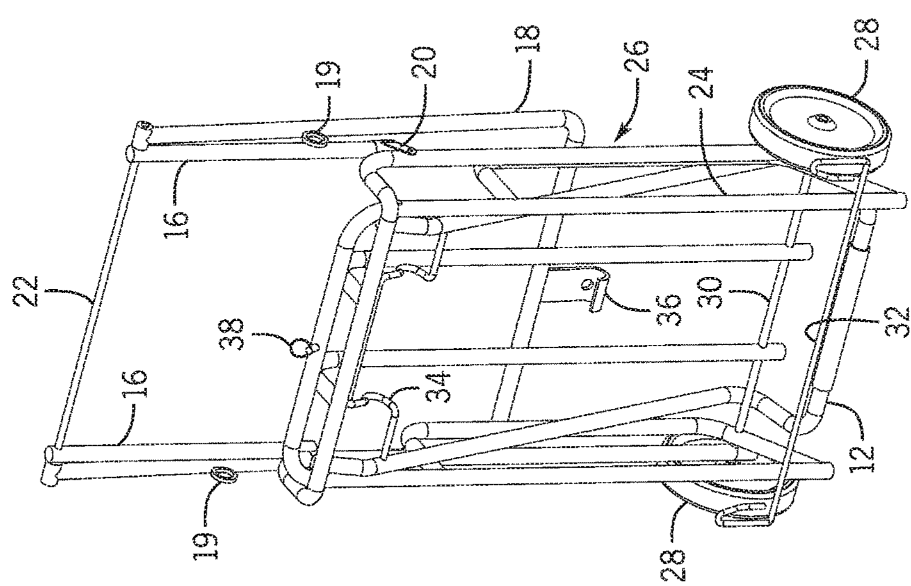
FIG. 4 is a front perspective view of the carrier in a stowed condition.
Figure 7C:
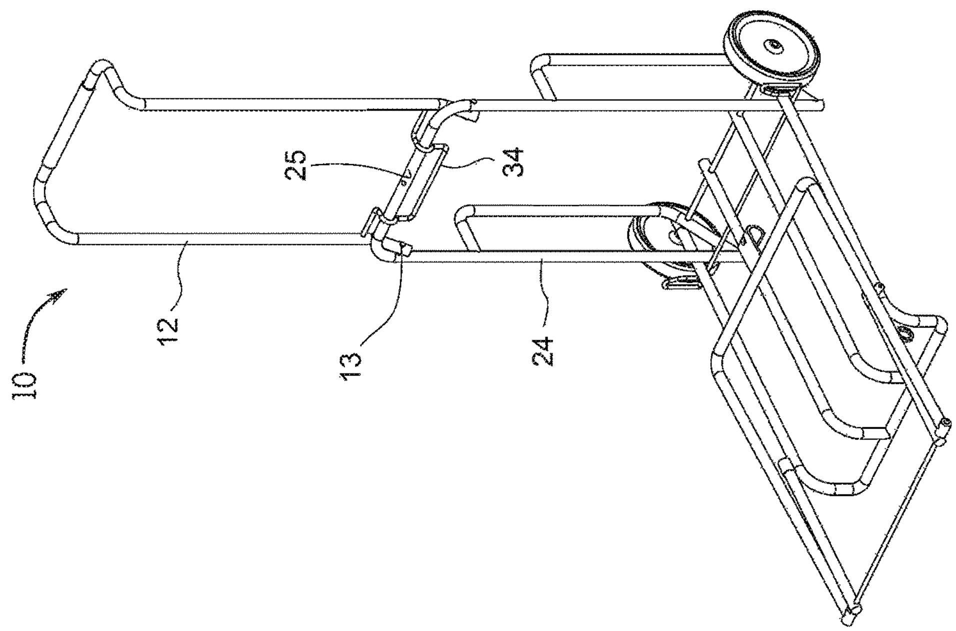
FIGS. 7A-7E show the steps in unfolding the carrier.
Figure 7B:
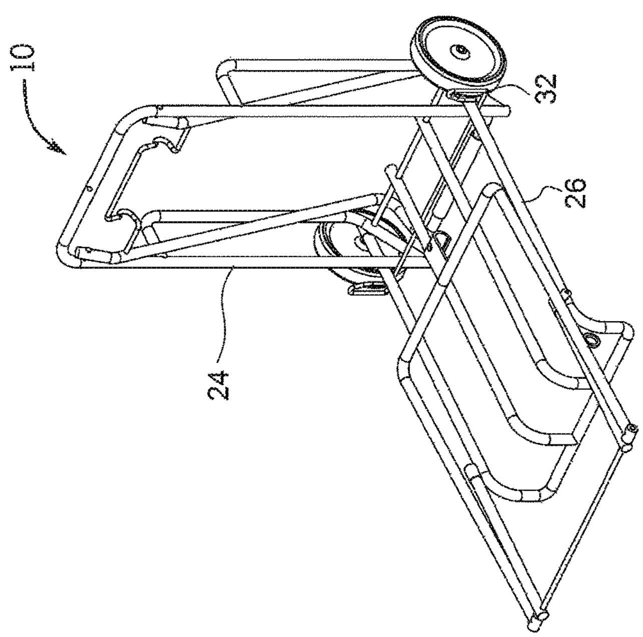
Figure 7A:
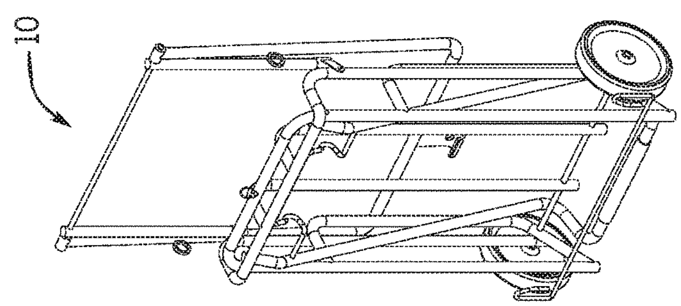
Figure 7E:
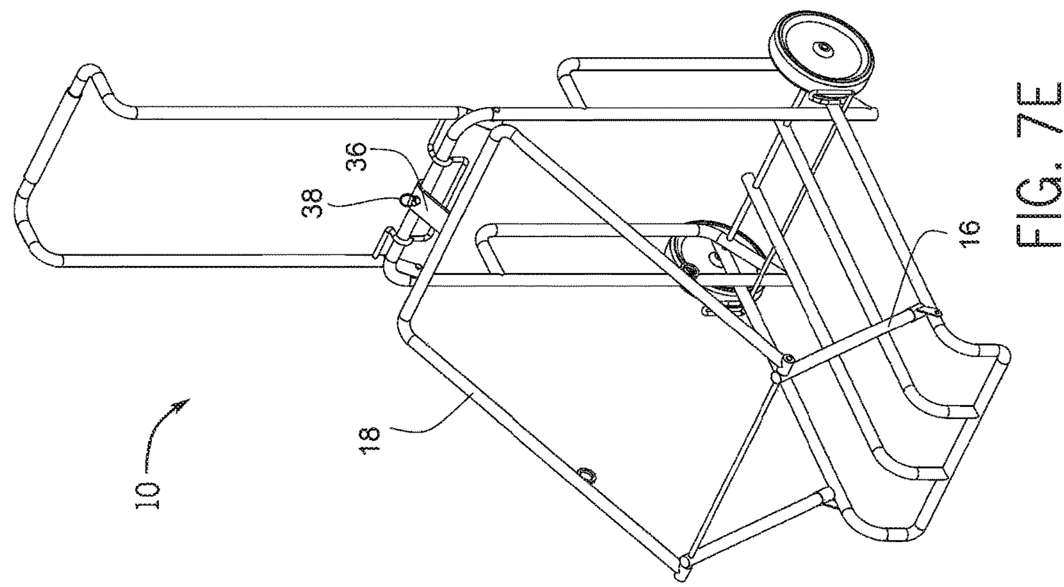
Figure 7D:
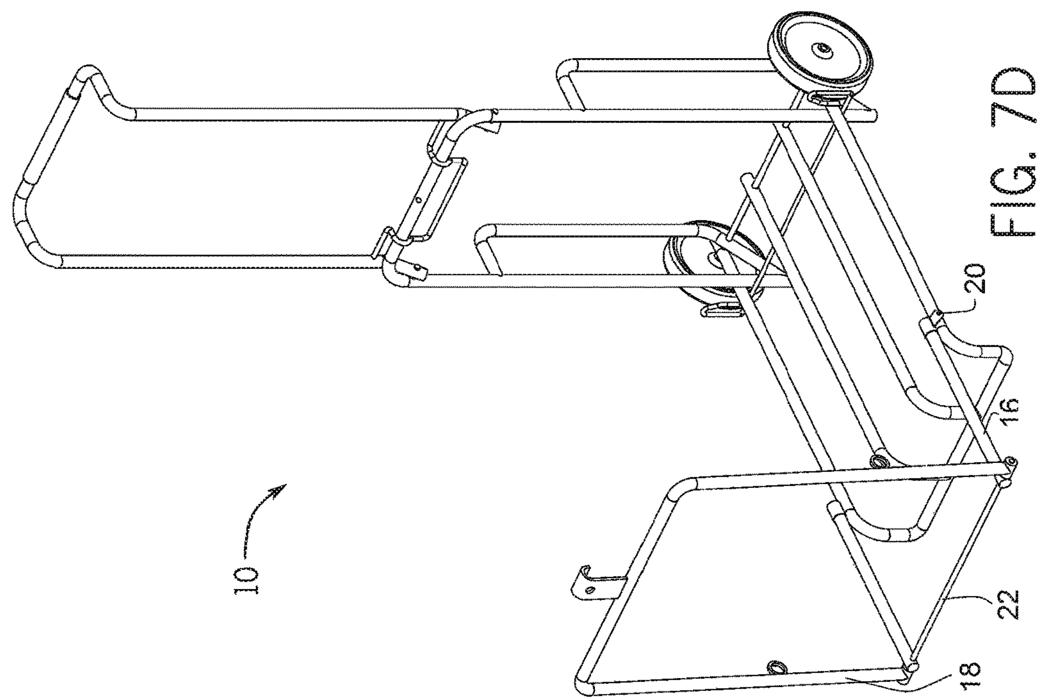

As seen in reference to FIGS. 4, 5, and 6, the carrier is shown in a stowed configuration. In further reference to FIGS. 7A-7E, the reconfiguration of the carrier 10 from its stowed configuration 7A to a carrier configuration 7E is illustrated. As an initial step, shown in FIG. 7B, the base frame 26 is rotated outwardly from the upright frame 24 and the outer elongate members are engaged by the retainers 32 to secure the base frame 26 in the extended position. Next the handle 12 is rotated about the pivots 13 to extend the handle 12 to an upright position. The latch 32 may then be rotated to secure the cross member 25 and retain the handle 12 in the upright position. Next, in reference to FIG. 7D, the receiver frame 18 is articulately rotated about the pivot arms 20, pivot rod 22 and struts 16. Finally, in reference to FIG. 7E, the receiver frame 18 is positioned so that the coupling plate 36 is aligned with the upright frame 24. The retaining pin 38 may secure the receiver frame 18 to the upright frame 24.

It should be understood, of course, that the foregoing relates to exemplary embodiments of the invention and that modifications may be made without departing from the spirit and scope of the invention as set forth in the following claims.

The invention claimed is:

1. A collapsible cart, comprising:

an upright frame having a handle pivotally attached to an upper portion of the upright frame and an axle supporting a pair of ground transport wheels extending through a bottom portion of the upright frame;

a base frame having a forward support at a front end of the base frame and an aft end that is pivotally disposed about the axle; and a receiver frame articulately connected to a forward portion of the base frame via a strut and releasably connected at an aft portion of the receiver frame to a cross member positioned at the upper portion of the upright frame; and a latch pivotally disposed between opposed sides of the handle, wherein the latch is selectably movable to an engaged position to secure the handle in an upright position.

2. The collapsible cart of claim 1, wherein the latch is movable to a released position to permit the handle to pivot about the upright frame.

3. The collapsible cart of claim 2, further comprising:

a coupler plate attached to an aft end of the receiver frame, wherein the coupler plate is releasably attached to the cross member via a fastener.

4. The collapsible cart of claim 3, wherein the fastener is a quick release pin.

5. The collapsible cart of claim 4, further comprising:

an aft frame member extending rearwardly from an upper portion of the upright frame then downwardly and a generally parallel to the upright frame a lower angled portion that extends forwardly to rejoin the upright frame at a bottom end thereof.

6. The collapsible cart of claim 5, wherein the axle is received through an aperture extending through the lower angled portion of the aft frame.

7. The collapsible cart of claim 6, wherein the receiver frame is configured to removably receive a child carrier.

8. The collapsible cart of claim 7, wherein the child carrier is a car seat.

9. A convertible carrier, configurable between a child seat carrier and a utility carrier, comprising:

an upright frame having a handle pivotally attached to an upper portion of the upright frame and an axle supporting a pair of ground transport wheels extending through a bottom portion of the upright frame;

a base frame having a forward support at a front end of the base frame and an aft end that is pivotally disposed about the axle; and a receiver frame articulately connected to a forward portion of the base frame via a strut and releasably connected at an aft portion of the receiver frame to a cross member positioned at the upper portion of the upright frame, such that when connected, the receiver frame is configured to receive the child seat, and when released the receiver frame and base frame are configured as a utility carrier; and a latch pivotally disposed between opposed sides of the handle, wherein the latch is selectably movable to an engaged position to secure the handle in an upright position.

10. The convertible carrier of claim 9, wherein the latch is movable to a released position to permit the handle to pivot about the upright frame.

11. The convertible carrier of claim 9, further comprising:

a coupler plate attached to an aft end of the receiver frame, wherein the coupler plate is releasably attached to the cross member via a fastener.

12. The convertible carrier of claim 11, wherein the fastener is a quick release pin.

13. The convertible carrier of claim 9, further comprising:

an aft frame member extending rearwardly from an upper portion of the upright frame then downwardly and a generally parallel to the upright frame a lower angled portion that extends forwardly to rejoin the upright frame at a bottom end thereof.

14. The convertible carrier of claim 13, wherein the axle is received through an aperture extending through the lower angled portion of the aft frame.

15. A convertible carrier, configurable between a child seat carrier and a utility carrier, comprising:

an upright frame having a handle pivotally attached to an upper portion of the upright frame and an axle supporting a pair of ground transport wheels extending through a bottom portion of the upright frame;

a base frame having a forward support at a front end of the base frame and an aft end that is pivotally disposed about the axle; and a receiver frame articulately connected to a forward portion of the base frame via a strut and releasably connected at an aft portion of the receiver frame to a cross member positioned at the upper portion of the upright frame, such that when connected, the receiver frame is configured to receive the child seat, and when released the receiver frame and base frame are configured as a utility carrier; and an aft frame member extending rearwardly from an upper portion of the upright frame then downwardly and a generally parallel to the upright frame, and a lower angled portion that extends forwardly to rejoin the upright frame at a bottom end thereof.

16. The convertible carrier of claim 15, wherein the axle is received through an aperture extending through the lower angled portion of the aft frame.

17. The convertible carrier of claim 15, further comprising:

a coupler plate attached to an aft end of the receiver frame, wherein the coupler plate is releasably attached to the cross member via a fastener.

18. The convertible carrier of claim 17, wherein the fastener is a quick release pin.

19. The convertible carrier of claim 15, further comprising:

a latch pivotally disposed between opposed sides of the handle, wherein the latch is selectably movable to an engaged position to secure the handle in an upright position.

20. The convertible carrier of claim 19, wherein the latch is movable to a released position to permit the handle to pivot about the upright frame.

* * * * *